United States Patent Office

3,560,066
Patented Feb. 2, 1971

3,560,066
ATMOSPHERE CONTROL SYSTEM FOR MANIPULATOR WALL PENETRATION
Demetrius G. Jelatis and Lester W. Haaker, Red Wing, Minn., assignors to Central Research Laboratories, Inc., Red Wing, Minn., a corporation of Minnesota
Filed July 3, 1969, Ser. No. 838,786
Int. Cl. A41g *11/00*
U.S. Cl. 312—1                                                                10 Claims

ABSTRACT OF THE DISCLOSURE

An atmosphere control system against passage of gases or gas-borne substances for the horizontal through tube of a remote control master-slave manipulator. The system includes a pair of spaced apart sealing assemblies with gas chamber between. The manipulator tie rods are sealed by booting. The motion tapes and cables pass between felt wipers. Safety of the operator and/or control of the cell atmosphere is insured by maintaining gas under slight pressure in the gas chamber so as to cause controlled leakage outwardly from that chamber in both directions. Spaced apart rotary lip seals with gas chamber between are also provided in the annular space between the through tube and wall opening to permit free rotation of the through tube while maintaining an effective seal.

---

Figure 1:
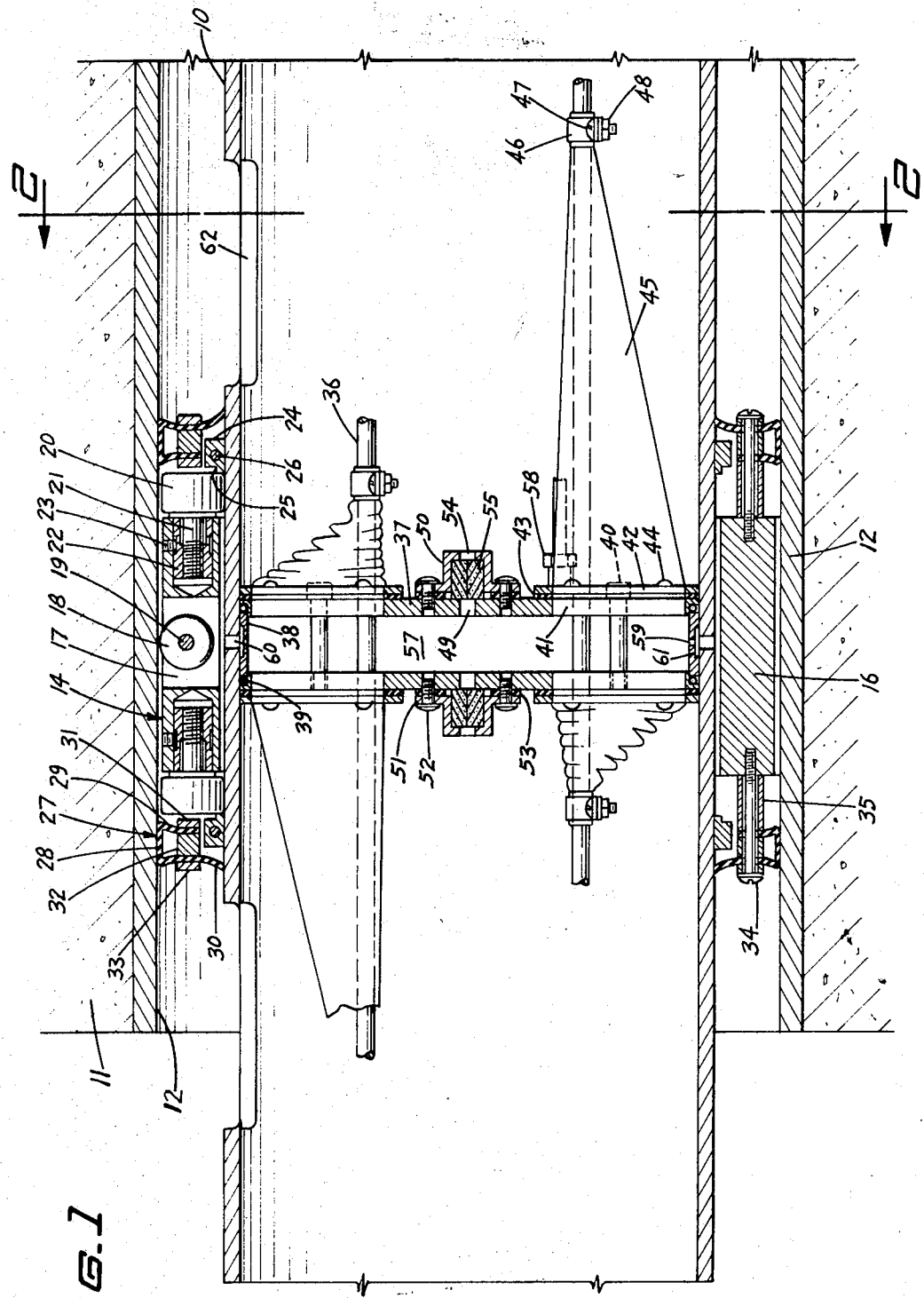

This invention relates to protective sealing against gases or gas-borne substances for the interior of the horizontal support or through tube of through-the-wall remote-control master-slave manipulators and for the annular space between the tubular support and wall openings. Such master-slave manipulators comprise generally a master arm and a slave arm, each pivotally connected to one of the opposite ends of a generally horizontal tubular support which extends through a generally vertical shielding wall. The through tube is mounted in a sleeve or tube set in the wall so as to permit rotation of the through tube about its longitudinal axis with resulting transmission of side-to-side or "X" motion from the master arm to the slave arm. Typical of such manipulators are those shown in Jelatis et al. U.S. Pats. No. 2,888,154 issued May 29, 1959 and No. 3,139,990 issued July 7, 1964.

The most common use of such manipulators is in the handling of radioactive and other hazardous materials in a dangerous area on one side of a barrier wall from a safe area on the opposite side of that wall where the operator is positioned. Depending upon the nature of the work being performed, the slave cell commonly contains a controlled gas atmosphere or is maintained at a reduced pressure in order to minimize any outflow of gases or hazardous gas-borne substances. In order to prevent endangering of personnel due to the escape of harmful products through the opening in the barrier wall through which the manipulator extends, or to prevent inflow of atmospheric gas into the cell, pains must be taken to minimize or eliminate any openings through which harmful materials can pass. This task is complicated by the necessity of transmitting manipulative motions from the operator's side of the barrier wall to the slave cell.

While complete protection can be provided by means of a sealed manipulator as exemplified by U.S. Pat. No. 3,164,267 issued Jan. 5, 1965 to Demetrius G. Jelatis, Robert A. Olsen and Lester W. Haaker (Jelatis and Haaker being co-inventors of the present invention), such installations tend to be relatively expensive. Because they may provide greater protection than may be necessary in particular instances, the high cost cannot always be justified. There is a need for less expensive protection against escape of gas-borne materials from the slave cell which might be harmful to the operator, and also against inflow of ambient atmosphere from the operator's side which may degrade the protective atmosphere in the work area on the slave side of the manipulator. The present invention is directed toward fulfilling these requirements.

The present invention is directed to a protective sealing system against transmission of gases or gas-borne substances for the interior of the through tube used in most instances in conjunction with a protective shielding system for the annular space between the manipulator through tube and the opening in the barrier wall through which that tubular support extends.

Figure 2:
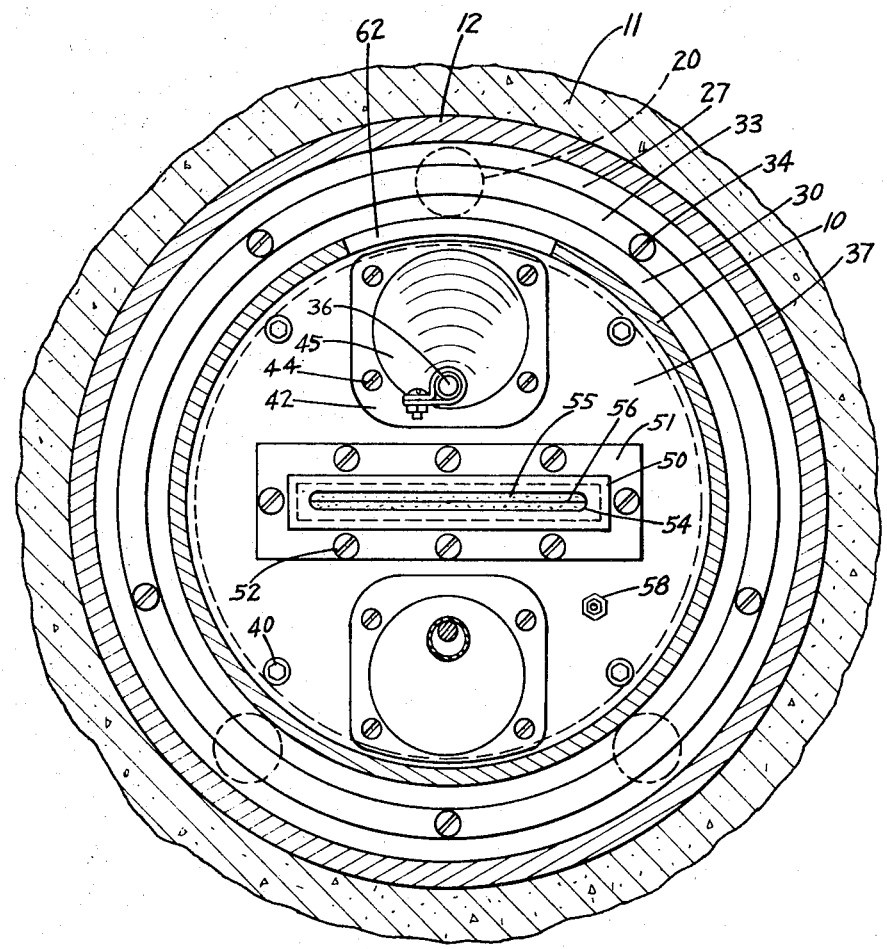

The invention is illustrated in the accompanying drawings in which the same numerals refer to corresponding parts and in which:

FIG. 1 is a fragmentary side elevation, partly in section along a plane extending along the longitudinal axis, showing a through tube of a master-slave manipulator mounted in a barrier wall and utilizing protective sealing means according to the present invention; and FIG. 2 is an end elevation, partly in section along the line 2—2 of FIG. 1.

Referring now to the drawings, there is shown the slave cell end of the rotatable horizontal support or through tube 10 of a remote control master-slave manipulator. The through tube 10 extends through a protective shielding or barrier wall 11 which is of substantial thickness. The opening for passage of the through tube through wall 11 is ordinarily fitted with a stationary tube or sleeve 12. Through tube 10 is supported within sleeve 12 by a slave roller truck mount assembly (indicated generally at 14) at one end and a similar master roller truck mount assembly (not shown) at the other end. The roller truck mount assemblies are the subject of U.S. Pat. No. 3,410,-418 issued Nov. 12, 1968 to Frank G. Chesley and Lester W. Haaker, one of the present co-inventors, and are fully described and illustrated therein. The same numbering system for the roller truck mount structure is used herein so far as feasible.

The slave roller truck mount assembly includes a ring 16 whose outer diameter is slightly less than the diameter of sleeve 12 in order to be received therein coaxially and whose inner diameter is slightly larger than the outer diameter of through tube 10 in order to receive that tube coaxially. Approximately midway between the ends of the ring 16 and spaced circumferentially around the ring are a plurality of short longitudinal slots 17 in which are journaled rollers 18 on shafts 19 whose axes lie generally perpendicular to radial planes extending through the longitudinal axis of the ring 16. The rollers 18 are so positioned that the peripheries of the rollers extend beyond the outer periphery of the ring 16 so as to permit the rollers to engage sleeve 12 without direct engagement between the ring and sleeve. The peripheries of rollers 18 do not extend substantially beyond the inner periphery of ring 16 so as to interfere with free rotational movement of through tube 10 mounted within ring 16.

A plurality of rollers 20 are mounted on the front and back face edges of ring 16. Rollers 20 are journaled to rotate on parallel horizontal axes, the rollers themselves rotating in vertical planes. The axes of corresponding rollers on opposite faces of ring 16 are in substantial alignment. Preferably three rollers are mounted in each edge of ring 16. Rollers 20 are mounted in ring 16 so that their peripheries extend beyond the inner periphery of ring 16 but do not extend substantially beyond the outer perimeter of the ring. The rollers 20 support through tube 10 in its rotational movement but do not interfere with the free passage of ring 16 within sleeve 12 of the barrier wall. Roller 20, as shown, is mounted on a shaft 21 fitted into a collet or sleeve 22 which in turn is set into the top edge of ring 16 and held therein by set screw 23.

The rings 16 are constrained longitudinally with respect to through tube 10 by means of a retainer ring 24 fixed to the through tube 10 on each side of the truck roller mount assembly. Retainer ring 24 is provided with a relatively narrow inwardly directed lip 25 which bears against the faces of rollers 20 sufficient to prevent any substantial longitudinal movement of the roller truck mounts relative to the through tube. Each retainer ring 24 is split at one point around its circumference and the ends are connected by means of a screw 26 for fixing the retainer ring firmly about the outer periphery of the through tube.

A protective seal is provided in the annular space between the through tube 10 and sleeve 12 as follows: An annular ring seal 27 composed of flexible rubber or rubber-like synthetic resinous material (which is generally U-shaped in cross section before compression) is compressed and fit into the annular space. The seal 27, seen in cross section, has a crown portion 28, a short leg portion 29 on one side and a longer leg portion 30 on the other. In elevation, these leg portions are seen as annular rings.

The seal elements are sandwiched between a set of mounting rings comprising an inner ring 31, an intermediate ring 32 and an outer ring 33. The shorter leg 29 of the seal is held between and compressed by the inner and intermediate rings 31 and 32, respectively. The outer leg 30 of the seal ring is held and compressed between the middle ring 32 and outer ring 33. The mounting ring elements are held together, as by means of a plurality of screws 34 which are spaced circumferentially about the rings and extend through each of the rings and into ring 16 of the roller truck mount. Spacers 35 hold the seal mounting rings 31–33 outwardly from rollers 20 so as not to interfere with rotation of those rollers.

The crown 28 of seal ring 27 is compressed into engagement with the stationary wall tube 12 and forms a stationary seal therewith. The longer leg 30 of the seal 27 is wider than the annular space between the sleeve 12 and rotatable tube 10 so that it is deformed slightly as shown and forms a tight seal against the outer surface of rotatable tube 10 within which the through tube 10 may be rotated freely. The extra width of the seal portion 30 automatically compensates for any wear of the seal surface in sliding contact with through tube 10.

As is well understood in the manipulator art, the back and forth or "Y" motion of the master arm toward and away from the barrier wall 11 is transmitted to the slave arm by means of a pair of vertically spaced tie rods 36 which lie generally along a vertical plane extending through the longitudinal axis of the through tube when the manipulator arms are in at-rest position. The ends of the tie rods are connected to the master and slave arms in a parrallelogram arrangement such that as the upper tie rod is moved in one direction, the lower tie rod is moved in the opposite direction.

The through tube 10 is closed off by means of a transverse barrier comprised of a pair of sealing assemblies in the form of circular plates 37 held in spaced apart parallel relation by means of an annular ring 38 fitted against the interior wall of through tube 10. The inner rim of each plate 37 is recessed to receive an O-ring 39 which is compressed against the ends of ring 38 and against the inside wall of the through tube when the plates are drawn together and secured by means of screws 40.

Each plate 37 is provided with a pair of vertically spaced slots or holes 41 through which the tie rods 36 pass. Each hole 41 for passage of a tie rod is covered by a plate 42 surrounding the hole, gasketed by means of gasket 43 and secured by means of a plurality of screws 44. An elongated tubular, and preferably conical, flexible boot 45 is attached to or formed integral with ring 42 to form a gas-tight seal therewith and extends around the tie rod 36. The opposite end of the boot seal is secured in gas-tight relationship to the tie rod as by means of a clamp 46, bolt 47 and nut 48.

As shown in FIG. 1, the upper tie rod 36 is at about its limit of movement in the direction toward the slave cell and the lower tie rod at its corresponding limit of movement away from the slave cell. Accordingly, the boot on one side of the transverse barrier is in fully extended condition whereas the corresponding boot for the same tie rod on the opposite side of the transverse barrier is in fully contracted condition. The tie rods may be reciprocated to move the slave arm in its Y motion with the tie rods in fully sealed condition so as to prevent the transmission of any undesirable gases or gas-borne particles through the openings in the transverse barrier provided for the passage of and movement of the tie rods.

Other motions are transmitted from the master arm to the slave arm of the manipulator by means of linear motion transmission elements such as tapes and cables, as is well understood in the art. A central horizontal slot 49 is provided in each transverse plate 37 for the passage of such tapes and cables. In order to minimize movement of gases or hazardous substances through such slots, each slot is covered by a packing box 50 having a surrounding flange 51 by which the packing box is secured to plate 37 by means of screws 52. A gasket 53 underlying the flange incures a tight seal between the packing box and plate surface. The packing box 50 is provided with an elongated slot 54 which is in substantial alignment with slot 49. A pair of abutting resilient pads such as felt wipers 55 are disposed in the packing box with their interface extending between slots 49 and 54. The motion tapes and cables extend between the felt wipers at this interface.

While not affording an absolute seal, the felt wipers substantially prevent passage of undesirable substances from the slave cell through the slots 49 provided for passage of the motion tapes and cables. Advantage of the slight leakage which may occur is taken as follows: The space between plates 37 forms a gas chamber 57. A fitting 58 is provided in the plate 37 toward the operator's side of the barrier wall for connection to a gas supply which may be air or, in the case of a controlled atmosphere in the slave cell, may be of the same composition as that controlled atmosphere.

Chamber 57 is usually maintained at a pressure slightly greater than the pressures of both the slave cell and the ambient pressure at the operator's position, so that the controlled leakage which takes place from chamber 57 is toward the slave cell on one side and toward the environment of the operator on the other. By this means, air-borne contaminants or gases from the slave cell are effectively prevented from penetrating the transverse barrier, and similarly, atmospheric gases from the master side are prevented from penetrating into the cell.

Alternatively, in some instances chamber 57 may be maintained under reduced pressure by connecting fitting 58 to a vacuum source to draw off leakage gas.

The same gaseous atmosphere of chamber 57 is maintained in the annular chamber around the outside of the through tube between spaced apart seals 27. This is done by virtue of passages 59 in ring 38 and passages 60 in through tube 10. An annular channel 61 is desirably provided around the outside periphery of ring 38 so as to maintain communication for passage of gas from opening 59 to opening 60 even though these openings may not be in alignment. The gas supply may be monitored so as to give warning in the event of excessive gas flow, as in the case of a leak due to seal failure.

The protective sealing system is shown with both seals of the pair of ring seals 27 and both sealing plates 37 in association with the slave roller truck mount at the slave arm end of the through tube. Alternatively, the sealing structure may be provided at the master arm end of the through tube or one-half of each pair of sealing members may be provided at the master end and one-half at the slave end. As shown, hand holes 62 are provided in the through tube for access for assembly.

The embodiments of the invention in which an exclusive property or privilege is claimed are defined as follows:

1. A protective sealing system against the passage of gases or gas-borne substances through the horizontal tubular support of a remote-control master-slave manipulator in which "Y" motion is transmitted by tie rods and other motions are transmitted by linear motion transmission elements, said sealing system comprising:
  (A) at least two spaced apart sealing assemblies disposed in the horizontal tubular support of a manipulator,
  (B) said sealing assemblies
    (1) extending transverse to the longitudinal axis of said tubular support,
    (2) being fitted in close engagement with the interior wall of the tubular support, and
    (3) having passages for movement of tie rods and linear motion transmission elements,
  (C) a gas chamber between said sealing assemblies,
  (D) fitting means in one of said assemblies for connecting said chamber to a supply of gas under pressure or to a vacuum source,
  (E) booting secured to said tie rods and said sealing assemblies over said passages for movement of tie rods, and
  (F) sealing means in said sealing assemblies for said passages for movement of linear motion transmission elements.

2. A system according to claim 1 further characterized in that said booting comprises a flexible gas impervious sleeve surrounding the tie rod and secured thereto at one end in gas-tight relation and secured at the other end to the sealing assembly in gas-tight relation.

3. A system according to claim 2 further characterized in that said sleeve is elongated and conical, the conical tip thereof being secured to said tie rod.

4. A system according to claim 1 further characterized in that the sealing means for said linear motion transmission elements comprises a pair of abutting resilient wiping members, the linear motion transmission elements being adapted to pass therebetween at the interface between said members.

5. A system according to claim 4 further characterized in that said wiping members are formed from felt.

6. A system according to claim 1 further characterized in that a pair of seal rings is disposed in the annular space between the manipulator horizontal tubular support and the wall opening in which said manipulator is installed, the space between said seal rings being in communication with said gas chamber.

7. A system according to claim 6 further characterized in that each of said seal rings is generally U-shaped in cross section, the crown of said U-shaped member is compressed into stationary sealing engagement with the wall opening, one leg of said U-shaped member engages the outer surface of said horizontal tubular support in sliding rotary sealing engagement.

8. A system according to claim 6 further characterized in that:
  (A) said horizontal tubular support is carried in at least two roller truck mounts, and
  (B) at least one of said pair of seal rings is mounted on the forward face of one of said roller truck mounts and the other of said pair of seal rings is mounted on the rearward face of one of said roller truck mounts.

9. A protective sealing system against the passage of gases or gas-borne substances through the horizontal tubular support of a remote-control master-slave manipulator in which "Y" motion is transmitted by the tie rods and other motions are transmitted by linear motion transmission elements, said sealing system comprising:
  (A) at least two spaced apart sealing assemblies disposed in the horizontal tubular support of a manipulator,
  (B) said sealing assemblies
    (1) extending transverse to the longitudinal axis of said tubular support,
    (2) being fitted in close engagement with the interior wall of the tubular support, and
    (3) having passages for movement of tie rods and linear motion transmission elements,
  (C) a gas chamber between said sealing assemblies,
  (D) fitting means in one of said assemblies for connecting said chamber to a supply of gas under pressure or to a vacuum source,
  (E) an elongated flexible gas impervious sleeve surrounds each of said tie rods, said sleeve being secured to the tie rod in gas-tight relation at one end and secured at the other end in gas-tight relation to the sealing assembly over the passages for movement of the tie rod,
  (F) a pair of abutting resilient wiping members in said sealing assemblies, the linear motion transmission members being adapted to pass in sealing relationship between the wiping members at the interface therebetween, and
  (G) a pair of seal rings disposed in the annular space between the horizontal tubular support and the wall opening in which the manipulator is installed, the space between said seal rings being in communication with said gas chamber.

10. A system according to claim 9 further characterized in that:
  (A) said horizontal tubular support is carried in at least two horizontally spaced apart roller truck mounts,
  (B) at least one of said pair of seal rings is mounted on the forward face of one of said roller truck mounts and the other of said pair of seal rings is mounted on the rearward face of one of said roller truck mounts,
  (C) each of said seal rings is generally U-shaped in cross section,
  (D) the crown of said U-shaped member is compressed into stationary sealing engagement with the wall opening,
  (E) one leg of said U-shaped member engages the outer surface of said horizontal tubular support in sliding sealing engagement.

References Cited
UNITED STATES PATENTS

| | | | |
|---|---|---|---|
| 2,901,143 | 8/1959 | Pope | 312—1 |
| 3,450,450 | 6/1969 | Hopkins et al. | 312—1 |

PATRICK D. LAWSON, Primary Examiner

U.S. Cl. X.R.

214—1